United States Patent
Deme et al.

(10) Patent No.: US 7,222,912 B2
(45) Date of Patent: May 29, 2007

(54) AUTOMOTIVE VEHICLE BODY WITH HYDROFORMED COWL

(75) Inventors: Madhu R Deme, Novi, MI (US); Lawrence J Dupuis, Grosse Ile, MI (US); James W Lowe, Temperance, MI (US); James Antime Marleau, Jr., Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 156 days.

(21) Appl. No.: 10/904,697

(22) Filed: Nov. 23, 2004

(65) Prior Publication Data

US 2006/0108837 A1    May 25, 2006

(51) Int. Cl.
*B62D 25/08* (2006.01)
*B62D 21/03* (2006.01)

(52) U.S. Cl. .................. 296/203.02; 296/187.09; 296/192; 296/193.09; 296/205

(58) Field of Classification Search ............. 296/192, 296/203.02, 193.02, 205, 187.09, 187.12, 296/193.06, 193.05
See application file for complete search history.

(56) References Cited

U.S. PATENT DOCUMENTS

| | | | |
|---|---|---|---|
| 3,751,956 A | 8/1973 | Blanchi | |
| 4,730,870 A | 3/1988 | DeRees | |
| 4,883,309 A * | 11/1989 | Miyazaki et al. | 296/193.09 |
| 4,887,862 A | 12/1989 | Bassi | |
| 5,201,566 A * | 4/1993 | Mori | 296/192 |
| 5,533,372 A | 7/1996 | Roper et al. | |
| 6,070,786 A * | 6/2000 | Meier et al. | 228/157 |
| 6,302,478 B1 * | 10/2001 | Jaekel et al. | 296/205 |
| 6,322,124 B1 * | 11/2001 | Kim | 296/30 |
| 6,412,857 B2 * | 7/2002 | Jaekel et al. | 296/205 |
| 6,416,119 B1 | 7/2002 | Gericke et al. | |
| 6,533,025 B1 * | 3/2003 | Krogmeier et al. | 165/41 |
| 6,682,131 B2 * | 1/2004 | Hayashi | 296/192 |
| 6,685,259 B1 * | 2/2004 | Shimase et al. | 296/203.02 |
| 6,719,362 B1 * | 4/2004 | Johnson et al. | 296/192 |
| 2002/0042980 A1 | 4/2002 | Seifert et al. | |
| 2002/0163173 A1 | 11/2002 | Ruehl et al. | |

FOREIGN PATENT DOCUMENTS

EP    0 354 646 B1    5/1989

* cited by examiner

*Primary Examiner*—D. Glenn Dayoan
*Assistant Examiner*—Greg Blankenship
(74) *Attorney, Agent, or Firm*—Gigette M. Bejin; Artz & Artz, PC

(57) ABSTRACT

An automotive vehicle body includes a generally tubular, hydroformed cowl with integral mounting flanges which are welded to an engine compartment structural member and a cowlside member. The cowl may be hydroformed from several different preforms having both symmetrical and asymmetrical geometric characteristics.

17 Claims, 3 Drawing Sheets

AUTOMOTIVE VEHICLE BODY WITH HYDROFORMED COWL

BACKGROUND OF THE INVENTION

1. Field of the Invention

The present invention relates to a generally tubular, hydroformed cowl structure which is incorporated in an automotive body. The cowl extends laterally across the body either at the base of a windshield or at the base of the vehicle's rear window.

2. Disclosure Information

Automotive cowl structures are typically formed in two pieces, as shown in FIG. 6. According to this prior art construction, the inner cowl, 100, is stamped and then welded into place between the cowl sides of the vehicle. Then, the cowl top outer panel, 102, is added to the cowl inner, usually by spot welding. This process necessitates a multi-step operation with attendant complexity and high cost, because separate welding machines must be employed to both weld the cowl top inner 100 to the body as a whole, and then to weld the cowl top outer 102 to the assembled body structure. The present inventive hydroformed cowl eliminates the need to weld and seal a separate top, while allowing reduced complexity in terms of parts needed to join the cowl with the cowl sides and the balance of the front end structure of a vehicle, while providing increased torsional rigidity and body integrity.

SUMMARY OF THE INVENTION

An automotive vehicle body includes a generally tubular, hydroformed cowl having at least one end with a plurality of integral mounting flanges. A cowlside member and a tubular, longitudinally extending engine compartment structural member are welded directly to the cowl flanges. Advantageously, the integral mounting flanges of the cowl are formed in a hydroforming die along with the balance of the cowl. The cowl's mounting flanges are vertically separated so as to allow the flanges to be welded to the top and bottom surfaces of a longitudinally extending engine compartment structure member.

According to another aspect of the present invention, the inventive cowl further has an integral double thickness flange which is employed for attaching the A-pillar of the body to the cowl. A long, double thickness flange extends laterally across the body and supports the vehicle's windshield. Optionally, an integral double-thickness flange extending laterally across the vehicle body at a lower portion of the cowl may be attached to a dash panel of the body.

According to yet another aspect of the present invention, a cowl may be hydroformed from a preform tube having two frustro-conical end sections either joined by a cylindrical midsection, or joined at the smallest diameter of each of the frustro-conical sections. Alternatively, the cowl may be hydroformed from a preform which includes a single frustro-conical preform tube. In any event, the preforms may be advantageously formed from metallic or non-metallic materials, including materials having different gauge thicknesses.

As formed, a hydroformed cowl structure for an automotive vehicle according to the present invention includes a hydroformed tubular member having a mid-section and a plurality of end sections which are generally larger than the mid-section. A plurality of lateral mounting flanges is also formed, preferably by the hydroforming die, integrally from each of the end sections so that the flanges are adapted to join the cowl structure to a plurality of structural members of an engine compartment. A cowl according to the present invention, as noted above, preferably includes A-pillar, windshield, and dash panel mounting flanges.

According to another aspect of the present invention, a method for assembling a body of an automotive vehicle includes the steps of hydroforming a cowl having integral, vertically separated mounting flanges, from a cylindrical preform having a non-constant diameter, and hydroforming at least one engine compartment structural member. Finally, the method includes welding the integral mounting flanges of the cowl directly to the structural member and to an A-pillar of the vehicle. Additional steps include welding of a dash panel to the cowl and mounting a windshield to the assembled A-pillar and cowl.

It is an advantage of the present cowl that a vehicle body may be produced with increased structural integrity, but at a lower cost due to the elimination of welding machines and stations and other ancillary operations such as sealing and installation of a cowl top.

It is a further advantage of the present invention that the body made with the current cowl is expected to exhibit increased resistance to unwanted noise vibration and harshness, particularly the phenomenon know as "cowl shake".

Other advantages, as well as objects and features of the present invention, will become apparent to the reader of this specification.

DETAILED DESCRIPTION OF THE PREFERRED EMBODIMENTS

Figure 1:
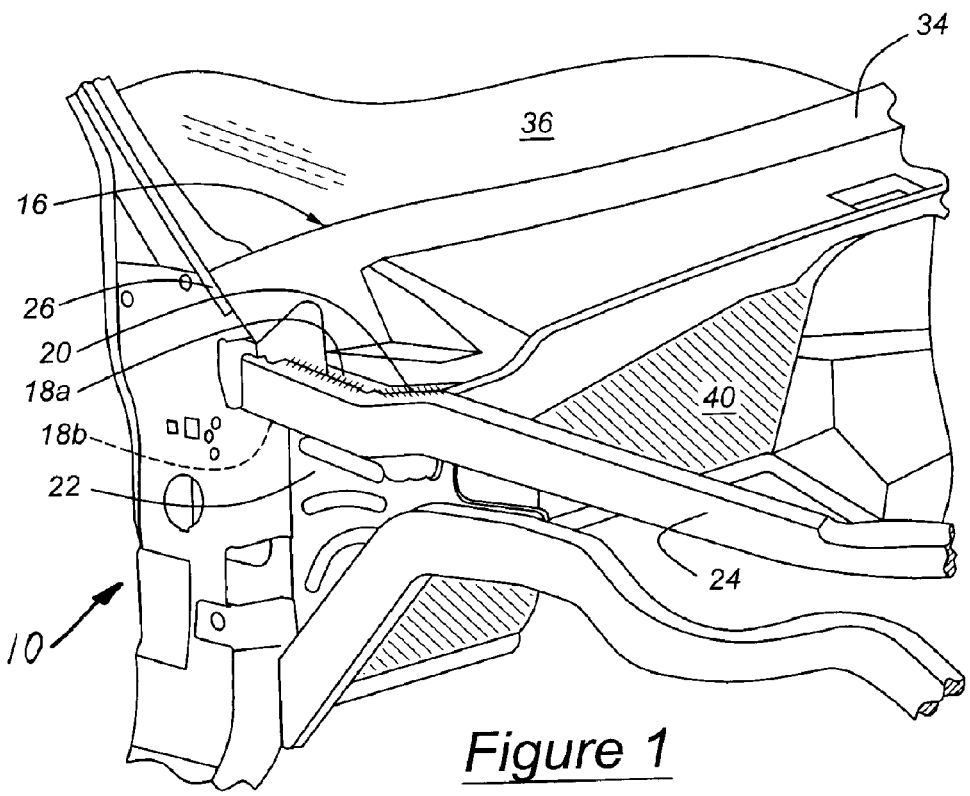
FIG. 1 is a vehicle body having a hydroformed cowl according to the present invention.

As shown in FIG. 1, vehicle body 10 has cowl 16, which is attached to cowlside 22 and structural member 24 by means of weldments 20 which directly mount cowl 16 to the cowlside 22 and structural member 24. This mounting is permitted by lateral mounting flanges 18*a* and *b*. Flange 18*a* is an upper flange, whereas flange 18*b* is a lower flange. Together, flanges 18*a* and 18*b* allow direct welding of cowl 16 to cowlside 22 and structural member 24, without the need for intermediate parts.

In addition to being welded to cowlside 22 and structural member 24, cowl 16 is welded at A-pillar mounting flange 26 to A-pillar 28. Mounting flanges 26 are double thickness flanges which are, as is the case with lateral mounting flanges 18, formed within the hydroforming die itself. This obviates the need for additional steps or processes to create the lateral and A-pillar mounting flanges.

Cowl 16 has windshield support flange 34, which is a double thickness flange, extending laterally across body 10 and supporting windshield 36. Because windshield support flange 34 is integral with cowl 16, there are no additional welding or sealing steps required to install windshield support flange 34, as would be the case with many prior art windshield mounting systems.

Depending upon the needs of a particular automotive body into which the inventive hydroformed cowl is being installed, cowl 16 may include a dash panel mounting flange, 38, (FIG. 2) which is a double-thickness flange extending laterally across body 10, and which may be attached to dash panel 40 by means of welding, bonding, mechanical fastening, or other types of fastening known to those skilled in the art and suggested by this disclosure.

Figure 2:
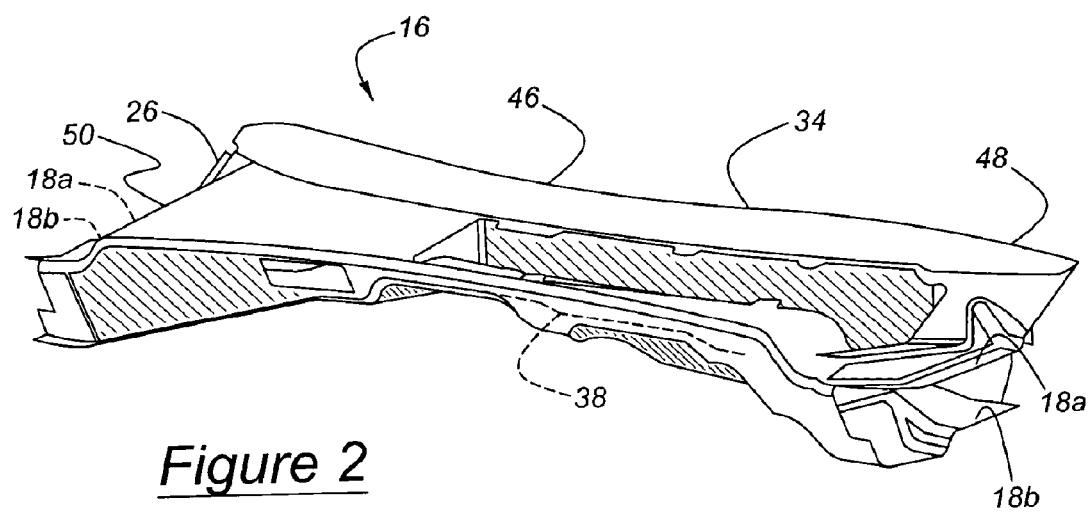
FIG. 2 is a perspective view of a cowl according to the present invention.

FIG. 2 illustrates additional features of a cowl according to the present invention. In addition to flanges 18a and b which are clearly seen in FIG. 2, as well as windshield support flange 34 and dash panel flange 38, it is seen that cowl 16 has a smaller dimensional mid-section 46, with larger end sections 48 and 50 hydroformed integrally with mid-section 46. The present inventors have determined that it is advantageous in certain applications to provide a preform for generating hydroformed part 16 as a laser welded blank having, as needed, different gauge thicknesses of metal or other materials joined together in an assembled preform which is placed in a hydroforming die and formed using conventional hydroforming practice.

Figure 3:
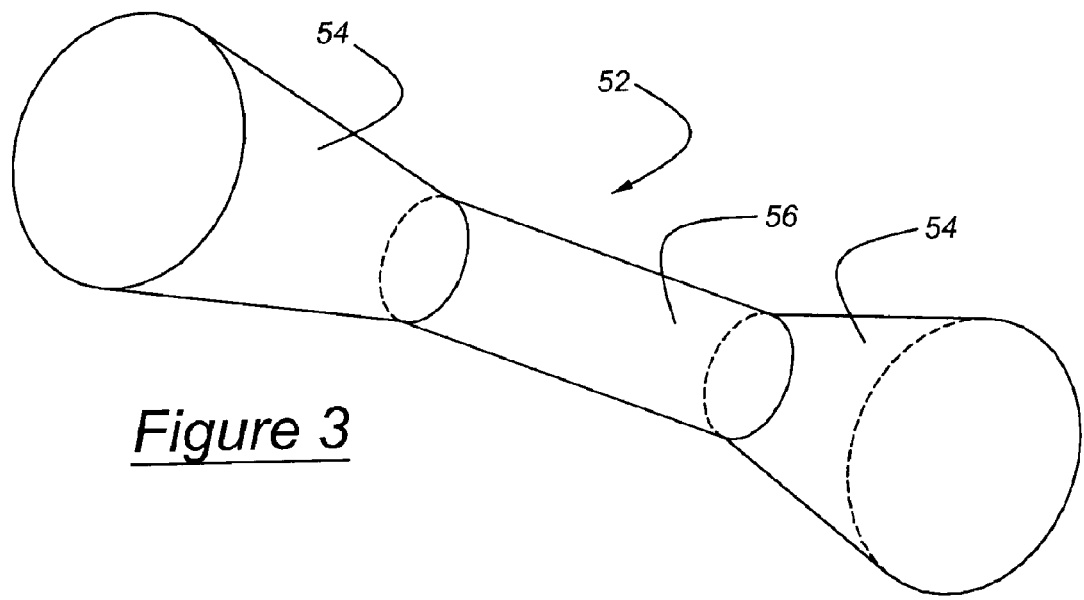
FIG. 3 is a perspective view of a preform for hydroforming a cowl according to the present invention.

FIG. 3 illustrates a first type of composite preform which two frustro-conical sections, 54 are joined by a single cylindrical section 56. This type of construction could be used where the cowl's configuration includes a constant cross-sectional mid-section occupying a considerable portion of the cowl's total length, combined with much larger end sections for housing such items as a climate control system, a brake booster, and a driver control system such as pedals, a steering column, etc.

Figure 4:
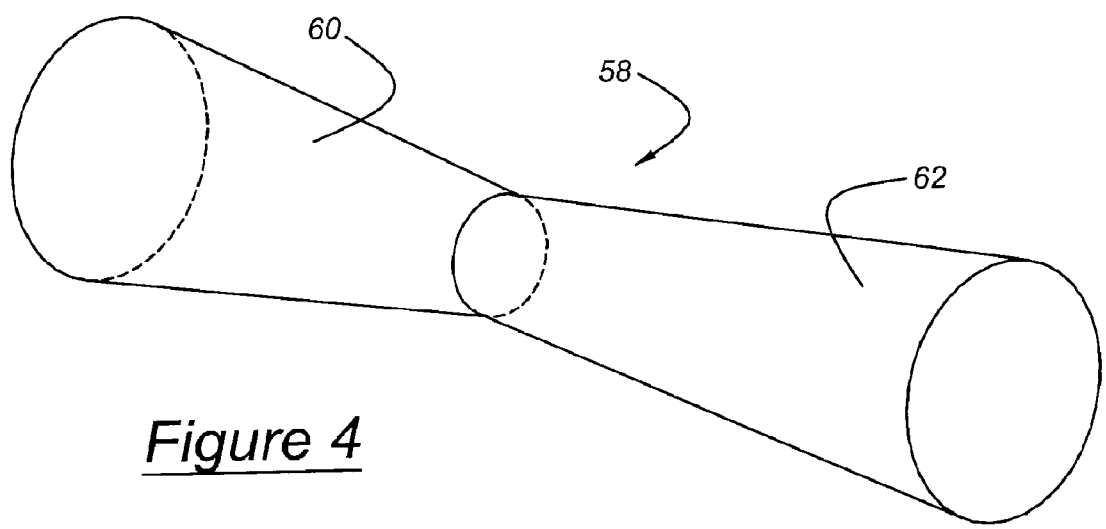
FIG. 4 is a perspective view of a second type of preform for hydroforming a cowl according to the present invention.

In certain cases, it may be desirable for a hydroformed cowl to have a generally varying cross section with the midpoint of the cowl being smaller than the ends, and in this case the preform construction of FIG. 4 which as before, contains laser welded blanks which may be of different metal thicknesses, may be optimal. For example, the metal gauge may be increased on the ends to accommodate more demanding loads imposed by structural strength considerations or mechanical equipment requirements.

Figure 5:
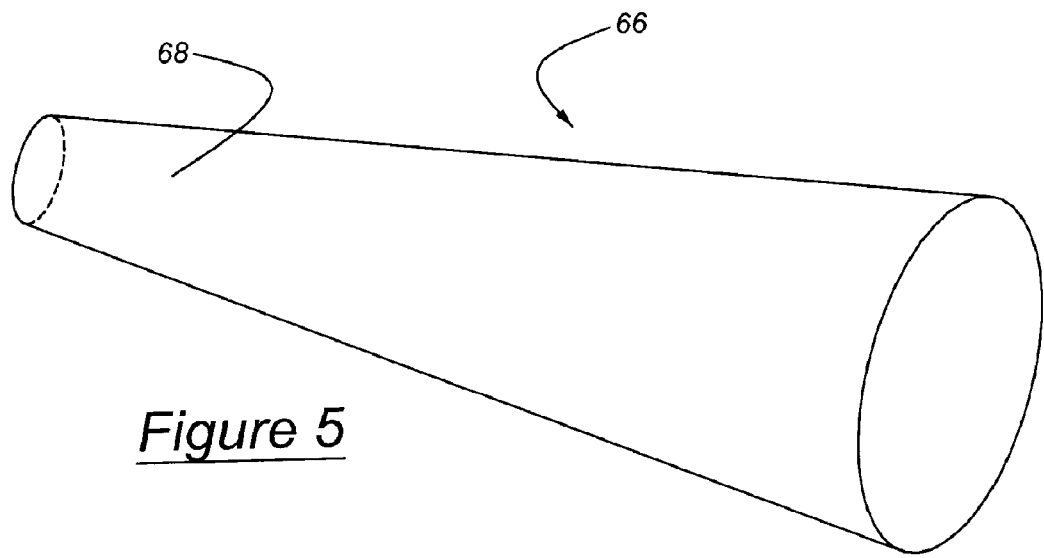
FIG. 5 is a perspective view of a third type of preform for hydroforming a cowl according to the present invention.
Figure 6:
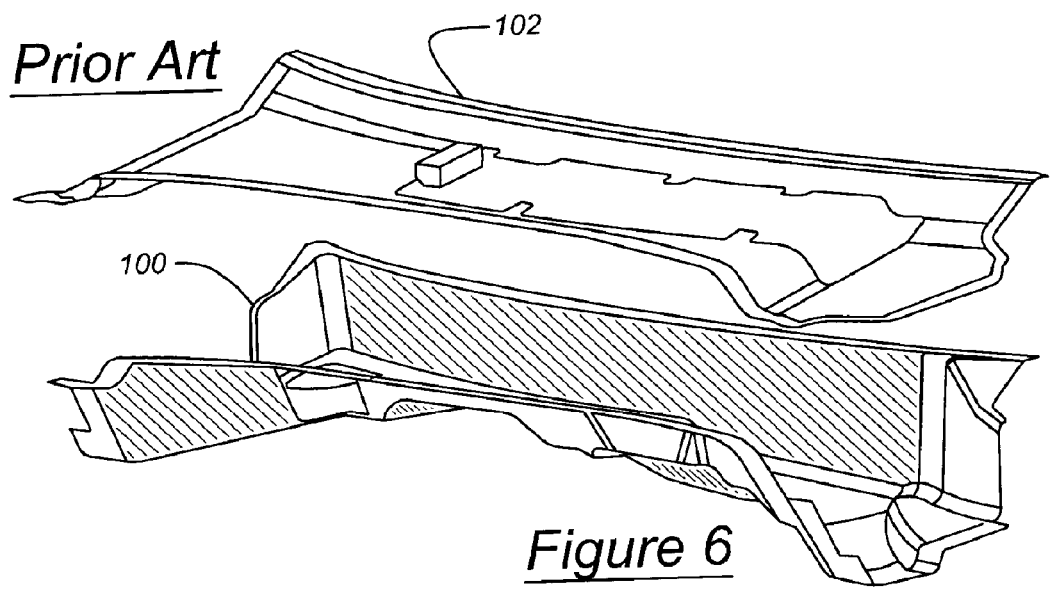
FIG. 6 is a perspective view of prior art stamped cowl and cowl top.

FIG. 5 illustrates a third type of preform having a continuously varying diameter, which may be employed where the desired cowl structure is largely asymmetrical. This may arise, for example, in a vehicle in which a climate control air handling system is mounted almost entirely within the engine compartment of the vehicle, necessitating a larger cowl structure. The preform of FIG. 5 could further be useful if the cowl is "dry", or in other words, not intended to permit an internal flow of rain water, as is the case with the cowl illustrated in FIGS. 1 and 2.

Although the present invention has been described in connection with particular embodiments thereof, it is to be understood that various modifications, alterations, and adaptations may be made by those skilled in the art without departing from the spirit and scope of the invention set forth in the following claims.

What is claimed is:

1. An automotive vehicle body, comprising:
    a hydroformed cowl having at least one end with a plurality of integral mounting flanges;
    a tubular, longitudinally extending engine compartment structural member;
    a cowlside member; and
    a plurality of weldments for attaching said cowl flanges directly to said engine compartment structural member and to said cowlside member.

2. An automotive body according to claim 1, wherein said mounting flanges are vertically separated.

3. An automotive vehicle body according to claim 1, wherein said cowl further comprises an integral double thickness flange attached to an A-pillar of said body.

4. An automotive vehicle body according to claim 1, wherein said cowl further comprises an integral double thickness flange extending laterally across said body and supporting a windshield.

5. An automotive vehicle body according to claim 1, wherein said cowl further comprises an integral double thickness flange extending laterally across said body and attached to a dash panel.

6. An automotive vehicle body according to claim 1, wherein said cowl is formed from a preform tube comprising two frustro-conical end sections joined by a cylindrical midsection.

7. An automotive vehicle body according to claim 6, wherein said frustro-conical end sections have different gauge thicknesses.

8. An automotive vehicle body according to claim 6, wherein said frustro-conical end sections are of unequal size.

9. An automotive vehicle body according to claim 1, wherein said cowl is formed from a single frustro-conical preform tube.

10. An automotive vehicle body according to claim 1, wherein said cowl is formed from a preform tube comprising two frustro-conical sections joined at the smallest diametral end of each of said sections.

11. An automotive vehicle body according to claim 10, wherein said frustro-conical sections have different gauge thicknesses.

12. A method for assembling a body for an automotive vehicle, comprising the steps of:
    hydroforming a cowl having integral, vertically separated mounting flanges, from a cylindrical preform having a non-constant diameter;
    hydroforming at least one engine compartment structural member; and
    welding said integral mounting flanges of said cowl directly to said structural member and to an A-pillar.

13. A method according to claim 12, further comprising the step of mounting a windshield to said A-pillar and to an integral, double-thickness flange formed in said cowl and extending laterally across said body.

14. A method according to claim 12, further comprising the step of mounting a dash panel to an integral double thickness flange formed in said cowl and extending laterally across said body.

15. A hydroformed cowl structure for an automotive vehicle, comprising:
    a hydroformed tubular member having a midsection and a plurality of end sections which are generally larger than the midsection, with said tubular member being formed from a preform tube comprising at least two laser welded conic sections;
    a plurality of lateral mounting flanges formed by a hydroforming die integrally from each of said end sections and adapted for joining the cowl structure to a plurality of tubular structural members of an engine compartment; and
    a plurality of a-pillar mounting flanges formed integrally from said end sections and adapted for joining the cowl structure to a plurality of a-pillars.

16. A hydroformed cowl structure according to claim 15, further comprising a laterally extending, integral, double-thickness windshield support flange formed as a trailing portion of said tubular member.

17. A hydroformed cowl structure according to claim 15, further comprising a laterally extending, double-thickness, dash panel weld flange formed as a depending portion of said tubular member.

* * * * *